(12) United States Patent
Hasegawa et al.

(10) Patent No.: US 8,212,515 B2
(45) Date of Patent: Jul. 3, 2012

(54) MICROCOMPUTER AND MOTOR CONTROL SYSTEM PROVIDED THEREWITH

(75) Inventors: Yukihisa Hasegawa, Tokyo (JP); Takehiro Hara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 436 days.

(21) Appl. No.: 12/501,742

(22) Filed: Jul. 13, 2009

(65) Prior Publication Data
US 2010/0007294 A1 Jan. 14, 2010

(30) Foreign Application Priority Data
Jul. 11, 2008 (JP) ................................. 2008-181347

(51) Int. Cl.
*G05B 19/29* (2006.01)

(52) U.S. Cl. ........................................ 318/601; 318/603

(58) Field of Classification Search .................. 318/601, 318/603, 605, 661, 599, 811
See application file for complete search history.

(56) References Cited

U.S. PATENT DOCUMENTS

| | | | | | |
|---|---|---|---|---|---|
| 4,631,510 | A | * | 12/1986 | Nagarkatti et al. | 336/135 |
| 5,469,032 | A | * | 11/1995 | Otake | 318/400.21 |
| 6,002,234 | A | * | 12/1999 | Ohm et al. | 318/729 |
| 6,191,550 | B1 | * | 2/2001 | Yoshihara | 318/661 |
| 6,525,502 | B1 | * | 2/2003 | Piedl et al. | 318/605 |
| 6,577,957 | B2 | * | 6/2003 | Fujimoto et al. | 702/36 |
| 6,615,152 | B2 | * | 9/2003 | Fujimoto et al. | 702/94 |
| 7,197,945 | B2 | * | 4/2007 | Yamamoto | 73/862.326 |
| 7,382,295 | B2 | * | 6/2008 | Otsuka et al. | 341/116 |

FOREIGN PATENT DOCUMENTS

| | | |
|---|---|---|
| JP | 11-83544 | 3/1999 |
| JP | 2005-114442 | 4/2005 |
| JP | 2005-210839 | 8/2005 |

* cited by examiner

*Primary Examiner* — Rina Duda
(74) *Attorney, Agent, or Firm* — Oblon, Spivak, McClelland, Maier & Neustadt, L.L.P.

(57) ABSTRACT

A microcomputer which obtains a rotor position signal from a biphase signal delivered by a resolver mounted on an electric motor according to a rotation phase of a rotor relative to a stator, thereby controlling the motor based on the rotor position signal. The microcomputer includes a digital signal converter which is configured by hardware and converts the biphase signal delivered from the resolver into a digital data position signal, the digital signal converter being mounted on a single chip.

7 Claims, 5 Drawing Sheets

MICROCOMPUTER AND MOTOR CONTROL SYSTEM PROVIDED THEREWITH

CROSS-REFERENCE TO RELATED APPLICATIONS

This application is based on and claims the benefit of priority from the prior Japanese Patent Application No. 2008-181347, filed on Jul. 11, 2008, the entire contents of which are incorporated herein by reference.

BACKGROUND

1. Field

The present invention relates to a microcomputer which obtains a rotor position signal from a biphase signal delivered from a resolver mounted on an electric motor, and a motor control system provided with the microcomputer.

2. Related Art

Low-cost position sensitive detectors such as a Hall element need to be disposed at a predetermined location of an electric motor to detect a rotor position in order that a brushless DC motor may be driven. However, an angle detected by the Hall element and indicative of a rotor position is coarse such that a position accuracy is low. In particular, when the Hall element is used for sinusoidal drive which necessitates a high accurate position detection, a detected angle is interpolated by a microcomputer or the like.

However, when the microcomputer is used as a position detecting unit, a ratio of position detection processing to a processing load of CPU is increased particularly in the use with electric motors driven at high speeds. This results in a problem that a time when the motor can be controlled is limited except for a period of execution of a position detection processing. In view of the problem, the use of a resolver which can detect a rotor location with high accuracy in a hardware manner has recently been increased.

A resolver signal needs to be converted to data in a motor system using a resolver so as to be loaded into a control element of the microcomputer or the like. A dedicated signal converter has been used in many cases for this purpose. For example, Japanese patent application publications JP-A-2005-114442 and JP-A-H11-83544 disclose arrangement examples of resolver data converters (RDCs) respectively. FIG. 5 schematically illustrates a motor control system using an RDC. A resolver 2 is mounted on a brushless DC motor 1 and includes an excitation coil to which an oscillator serving as data converting IC and incorporated in RDC 3 supplies an excitation signal. Output signals delivered from a cosine coil and a sine coil respectively are supplied into RDC 3. The output signals are differentially amplified. RDC 3 converts a rotor position of the motor 1 to, for example, about 12-bit digital signals based on the cosine and sine signals (biphase signals) delivered from the resolver 2, thereby delivering the digital signals. When reading the digital signals delivered from RDC 3 from an input port thereby to obtain information about rotational position of the motor 1, CPU 5 of a microcomputer 4 controls the motor 1 via an inverter 6 based on the position information.

In Japanese patent application publication JP-A-2005-114442, the converted data is transferred to the microcomputer by serial communication. For example, when data delivered from the resolver has a resolution of about 12-bit as described above, serial transfer of the data necessitates the time of 6 µs even with the use of a 20-MHz clock. Position accuracy information goes short even in the case of data renewal at intervals of 6 µs when a motor is driven at high speeds. Accordingly, data needs to be corrected at the microcomputer side.

In order that the aforementioned time delay may be eliminated, it is contemplated that data be parallel transferred to the microcomputer, as proposed by Japanese patent application publication JP-A-H11-83544. In this case, however, a large number of terminals of the microcomputer are used exclusively for processing resolver signals and accordingly, the number of terminals which can be used as I/O, whereupon a processing capacity of the microcomputer as a control system is decreased. To overcome the disadvantage, the assignee of the present application filed a patent application in Japan and the application was published under the publication number JP-A-2005-210839 on Aug. 4, 2005. In the Japanese patent application, the assignee has proposed an arrangement that resolver signals are directly delivered to a microcomputer to be processed by the use of software.

According to the technique disclosed by JP-A-2005-210839, a microcomputer which obtains a rotor position signal from a biphase signal delivered by a resolver mounted on an electric motor according to a rotation phase of a rotor relative to a stator, thereby controlling the motor based on the rotor position signal, the microcomputer comprising a digital signal converter which is configured by hardware and converts the biphase signal delivered from the resolver into a digital data position signal, the digital signal converter being mounted on a single chip, the terminals of the microcomputer are used only for input of resolver signals. Accordingly, obtained positional information can be transferred to CPU without delay. However, a module for executing conversion processing needs to be incorporated into a control program, and the processing capacity of the microcomputer is accordingly reduced as described above. Thus, although processing in a transmission system of the resolver signals can be sped up, the processing capacity of the microcomputer sometimes imposes restrictions on the high-speed control.

SUMMARY

Therefore, an object of the present invention is to provide a microcomputer having a function of fast converting an output signal of the resolver without dependence upon software, and a motor control system provided with the microcomputer.

According to one aspect of the present invention, there is provided a microcomputer which obtains a rotor position signal from a biphase signal delivered by a resolver mounted on an electric motor according to a rotation phase of a rotor relative to a stator, thereby controlling the motor based on the rotor position signal, the microcomputer comprising a digital signal converter which is configured by hardware and converts the biphase signal delivered from the resolver into a digital data position signal, the digital signal converter being mounted on a single chip, wherein the digital signal converter includes a first multiplier which multiplies a first phase signal delivered from the resolver by a signal shifted in phase by $\pi/2$ relative to an excitation signal by which the first phase signal is multiplied; a second multiplier which multiplies a second phase signal delivered from the resolver by a signal in phase with an excitation signal by which the second phase signal is multiplied; an adder which adds results of calculation by the first and second multipliers; a high-pass filter which passes predetermined higher frequencies as a result of addition by the adder, thereby delivering an output signal; and a phase comparison section which compares a phase of the output signal of the high-pass filter with a phase of signal having a frequency twice as high as the excitation signal thereby to obtain data further obtained by counting a phase difference between the compared signals by the counter, thereby delivering the obtained data as a position signal.

According to the above-described microcomputer, the position data detected by the resolver can be parallel transferred via an inner bus to a CPU fast since the digital signal converter of the resolver is mounted on the single chip. Furthermore, processing load of the CPU used for signal conversion in JP-A-2005-114442 can be reduced, and a relatively sufficient processing capacity can be distributed to other control. Consequently, a high-accurate motor can be realized.

According to another aspect of the invention, there is provided a motor control system comprising a motor control circuit including a microcomputer which obtains a rotor position signal from a biphase signal delivered by a resolver mounted on an electric motor according to a rotation phase of a rotor relative to a stator, thereby controlling the motor based on the rotor position signal, the microcomputer comprising a digital signal converter which is configured by hardware and converts the biphase signal delivered from the resolver into a digital data position signal, the digital signal converter being mounted on a single chip, and a drive circuit controlled by the motor control circuit to drive the motor, wherein the digital signal converter includes a first multiplier which multiplies a first phase signal delivered from the resolver by a signal shifted in phase by $\pi/2$ relative to an excitation signal by which the first phase signal is multiplied; a second multiplier which multiplies a second phase signal delivered from the resolver by a signal in phase with an excitation signal by which the second phase signal is multiplied; an adder which adds results of calculation by the first and second multipliers; a high-pass filter which passes predetermined higher frequencies as a result of addition by the adder, thereby delivering an output signal; and a phase comparison section which compares a phase of the output signal of the high-pass filter with a phase of signal having a frequency twice as high as the excitation signal thereby to obtain data further obtained by counting a phase difference between the compared signals by the counter, thereby delivering the obtained data as a position signal.

According to the above-described motor control system, the motor can be driven with high accuracy when controlled in a high-speed range using the resolver.

DETAILED DESCRIPTION

Figure 5:
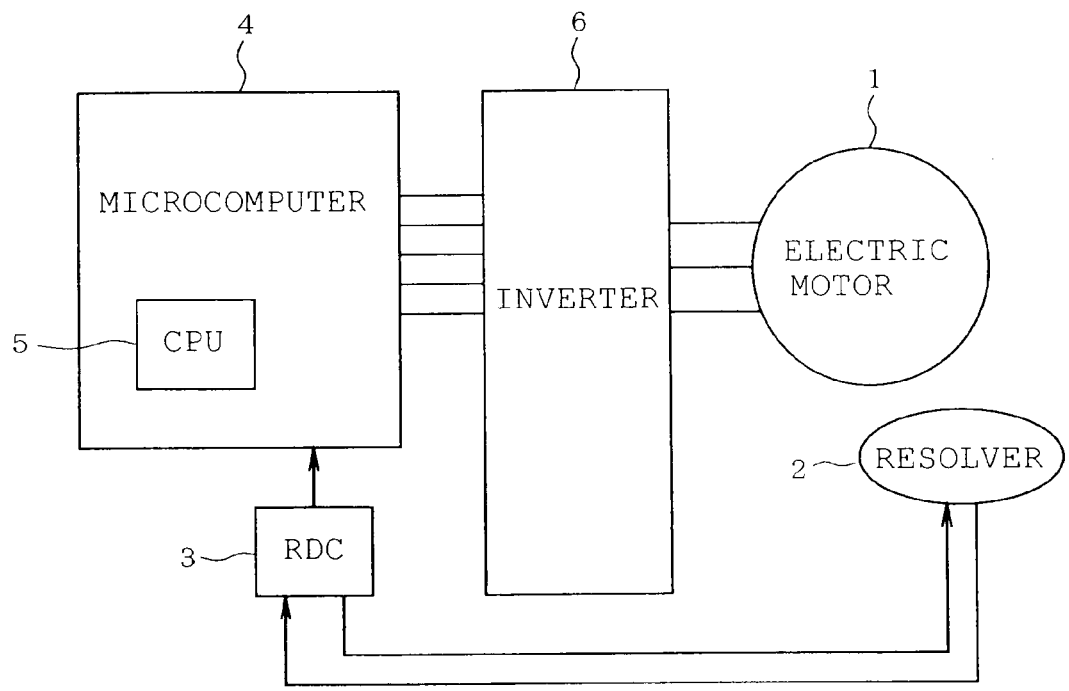
FIG. 5 is a view similar to FIG. 1, showing a related art arrangement.

A first embodiment will be described with reference to FIGS. 1 to 3B. In FIGS. 1 to 3B, identical or similar parts are labeled with the same reference symbols as those in FIG. 5 and the description of these parts is eliminated. Only the differences will be described in the following. A motor control system of the first embodiment comprises a microcomputer 11 (a motor control circuit 11) having a function corresponding to the RDC 3 except for the RDC 3 and the microcomputer 4 as shown in FIG. 5.

The microcomputer 11 comprises a single semiconductor chip on which are mounted a pulse-width-modulation (PWM) signal output section 15 composed of a central processing unit (CPU) 12, a triangular wave comparison timing signal generating section 13 (carrier wave output section; and hereinafter, "timing signal generating section"), and a digital signal converter 16 (RDC). Thus, the microcomputer 11 is configured into a one-chip microcomputer. An electric motor 1 may be a spindle motor rotating a disc recording medium such as a digital versatile disc (DVD), compact disc (CD) or hard disc drive (HDD), or a pump motor which transfers fuel in a vehicle.

The RDC 16 delivers an excitation signal fc (t) to a resolver 2 and converts a biphase signal delivered from the resolver 2 into data indicative of a rotor position of the electric motor 1, thereby delivering the data to the CPU 12 and the triangular wave comparison output generating section 14. Conversion processing by the RDC 16 is executed in synchronization with a timing signal delivered from the timing signal generating section 13. A current detector 17 detects current flowing via the inverter 6 (a drive circuit) into the motor 1. The RDC 16 is also configured to carry out an abnormal condition detecting process for the resolver 2 based on the current detected by the current detector 17. When detecting an abnormal condition of the resolver 2, the RDC 16 delivers an abnormal condition detection signal to the CPU 12.

An inverter 6 comprises, for example, six metal-oxide-semiconductor field-effect transistors (MOSFETs) or insulated gate bipolar transistors (IGBTs) which serve as switching elements and are connected into a three-phase bridge configuration. The PWM signal output section 15 of the microcomputer 11 delivers a PWM signal to a gate of each FET composing the inverter 6. The inverter 6 then supplies, for example, sine-wave current to a three-phase winding of the motor 1. The current detector 17 (a motor current detecting section) comprises a current transformer disposed between an output terminal of the inverter 6 and the winding of the motor 1 and a shunt resistor interposed between lower arm side switching elements of the inverter 6 and the ground.

Figure 1:
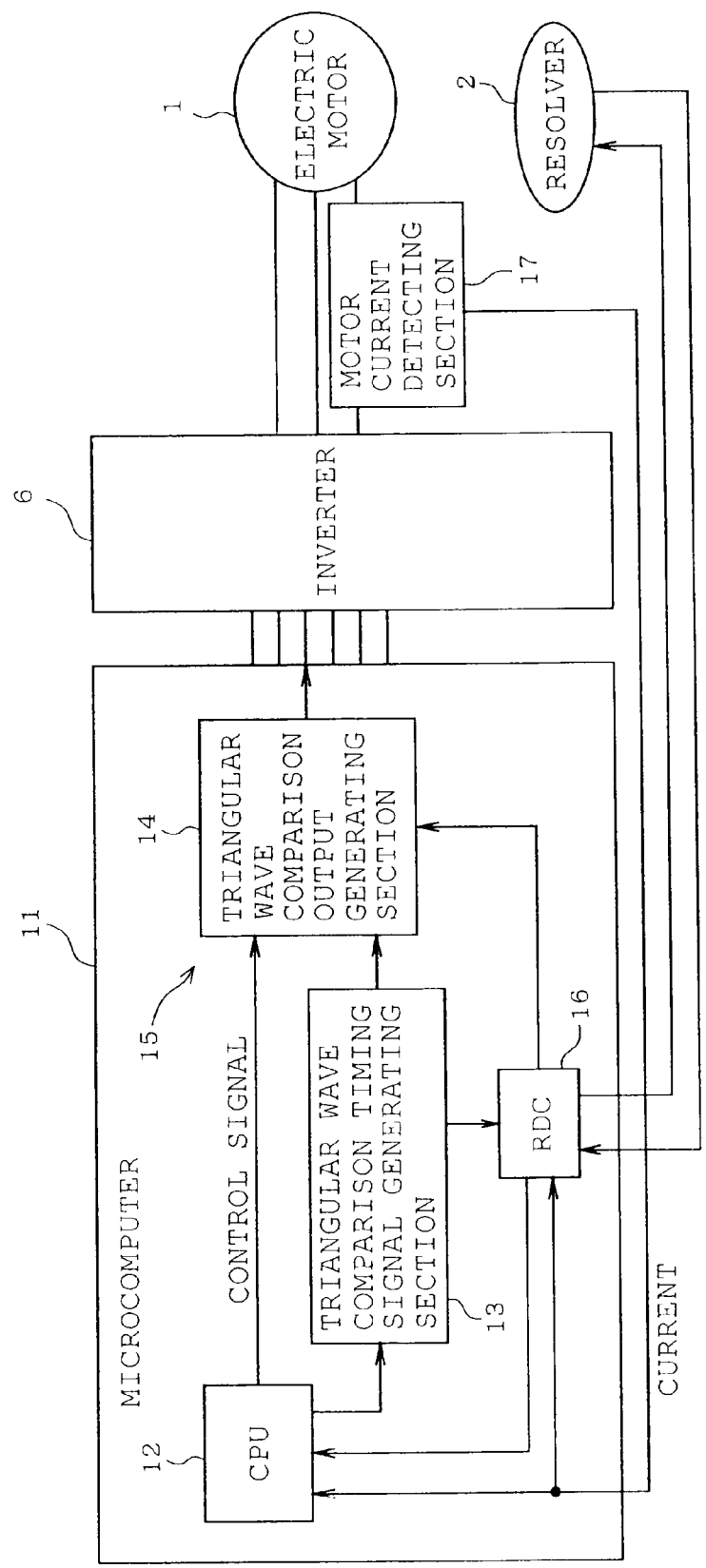
FIG. 1 is a schematic block diagram showing an electrical arrangement of the motor control system of a first embodiment.
Figure 2:
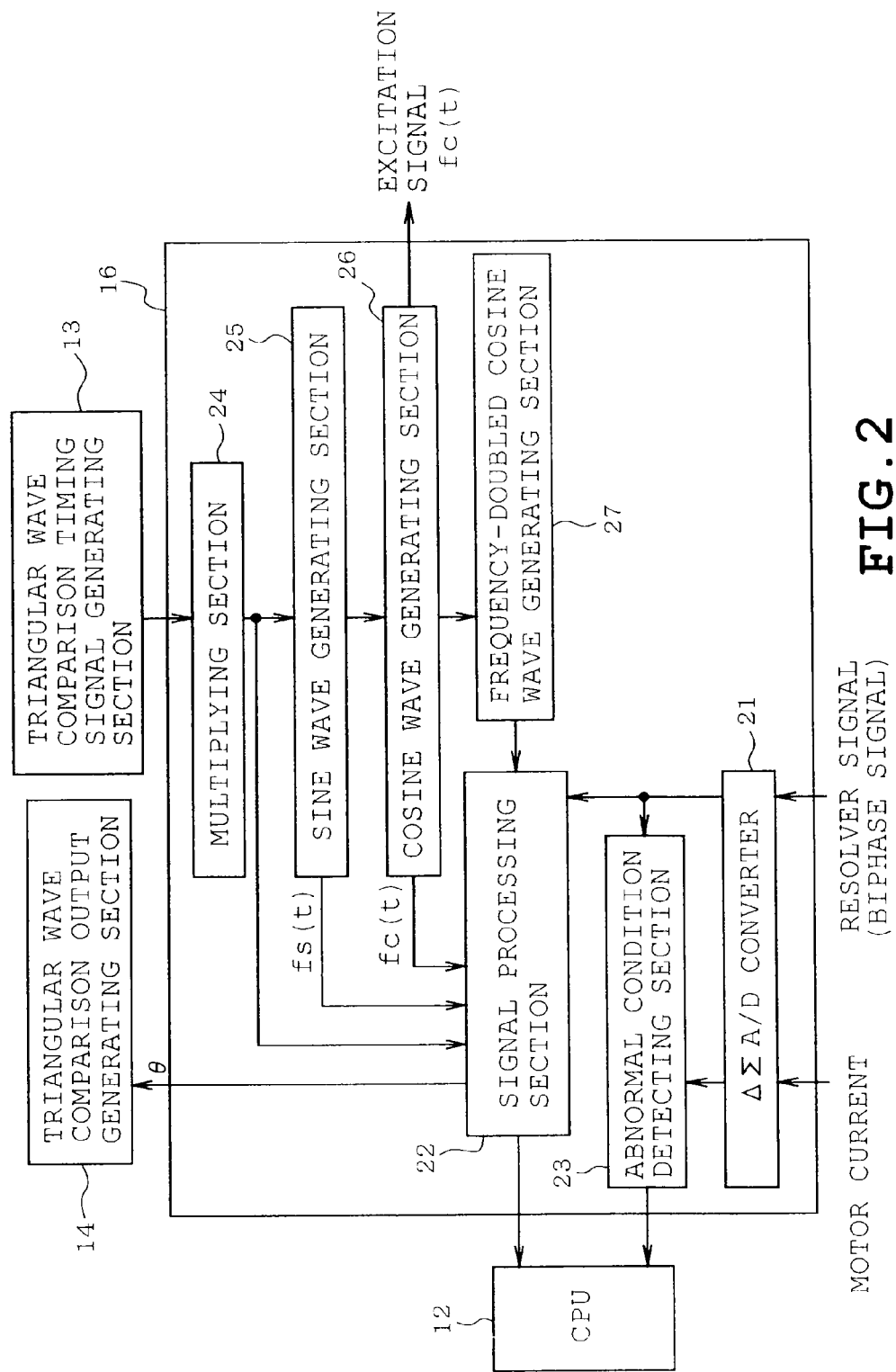
FIG. 2 is a functional block diagram showing an inner arrangement of the RDC.

FIG. 2 is a functional block diagram showing an inner arrangement of the RDC 16. A biphase signal of a sine-wave output and a cosine-wave output delivered from the resolver 2 and motor current detected by the current detector 17 are converted to digital data by a delta-sigma analog-to-digital ($\Delta\Sigma$A/D) converter 21. The obtained digital data is delivered to a signal processing section 22 and an abnormal condition detecting section 23 (a resolver abnormal condition detecting section). The timing signal generating section 13 generates a triangular wave signal having a frequency of, for example, about 15 kHz as a carrier wave for PWM control, delivering the triangular wave signal to the triangular wave comparison output generating section 14 and the RDC 16. The aforementioned carrier wave (or a timing signal having the same frequency) is multiplied by a frequency-doubler section 24, for example, thereby being delivered to the signal processing section 22 and a sine wave generating section 25.

The sine wave generating section 25 generates a sine wave signal $fs(t) = \sin \omega t$, which signal has a frequency obtained by doubling the PWM carrier wave. The obtained sine wave signal $fs(t) = \sin \omega t$ is delivered to the signal processing section 22 and a cosine wave generating section 26. The cosine wave generating section 26 generates a cosine wave signal $fc(t) = \cos \omega t$ obtained by shifting the phase of the sine wave signal forward by $\pi/2$. The generated cosine wave signal $fc(t) = \cos$ ωt is delivered to the signal processing section 22 and a frequency-doubled cosine wave generating section 27. The cosine wave signal is also delivered to the resolver 2 as an excitation signal. The frequency-doubled cosine wave generating section 27 generates a signal obtained by multiplying a frequency of the supplied cosine wave signal fc(t), delivering the signal to the signal processing section 22. Accordingly, when the PWM carrier wave has a frequency of 15 kHz, the excitation signal of the resolver 2 has a frequency of 30 kHz.

Figures 3A, 3B:
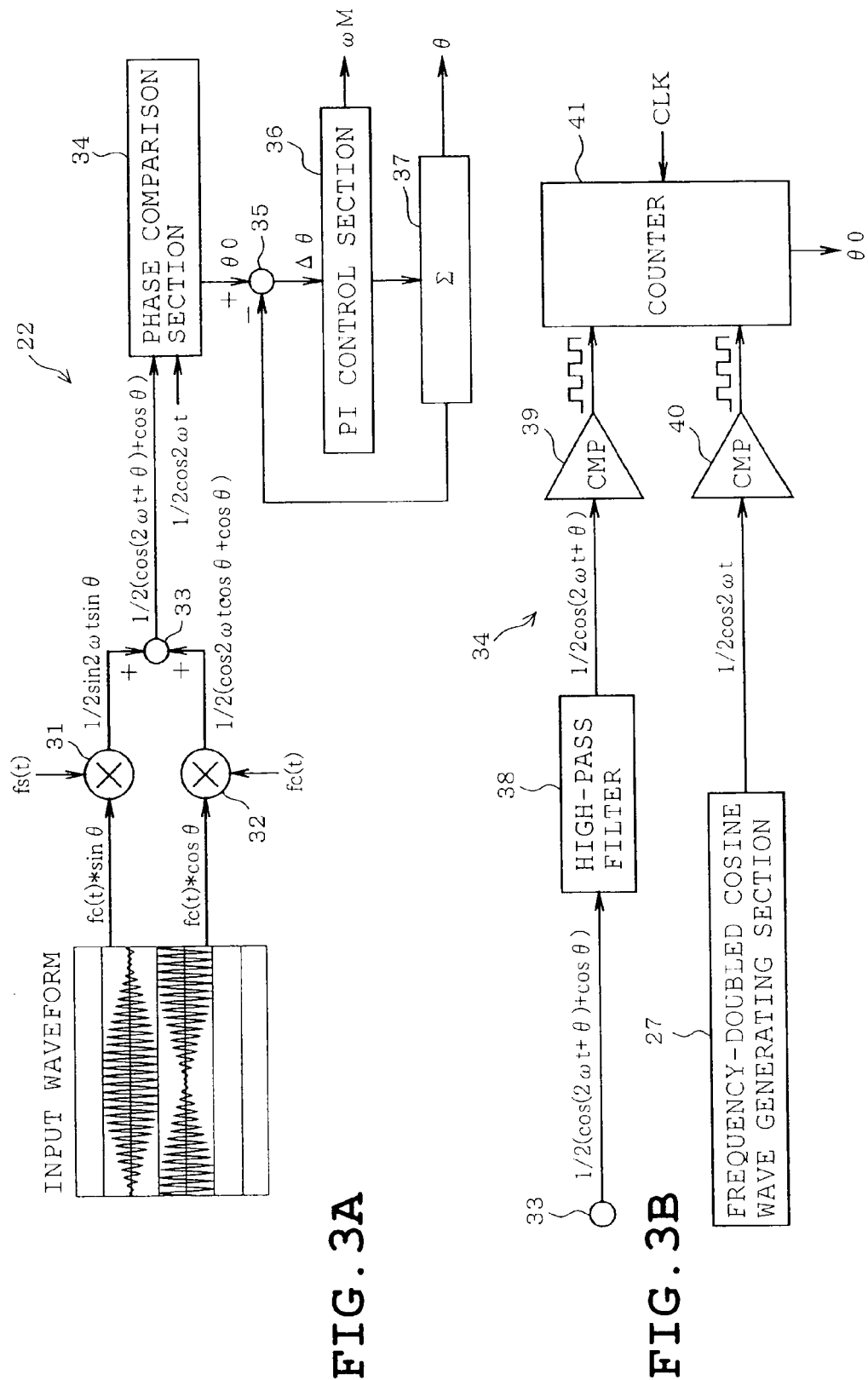
FIGS. 3A and 3B are block diagrams showing the signal processing section and an inner arrangement of a phase comparator respectively.

FIG. 3A shows an arrangement of the signal processing section 22. The biphase signal to be delivered by the resolver 2 serves as a first phase signal fc(t)·sin θ or as a second phase signal fc(t)·cos θ according to a rotation position θ of a rotor of the motor 1. The aforementioned biphase signal is converted by the A/D converter 21 to digital data, which digital data is then delivered to the signal processing section 22. The first and second phase signals are supplied to first and second multipliers 31 and 32 respectively. The first multiplier 31 multiplies the first phase signal by the sine wave signal fs (t), and the second multiplier 32 multiplies the second phase signal by the cosine wave signal fc(t). The results of multiplications by the first and second multipliers 31 and 32 are added together by an adder 33. The result of multiplication by the first multiplier 31 is shown by the following equation (1):

$$fc(t) \cdot \sin \theta \times fs(t) = \tfrac{1}{2} \cdot \sin 2\omega t \cdot \sin \theta \quad (1)$$

The result of multiplication by the second multiplier 32 is shown by the following equation (2):

$$fc(t) \cdot \cos \theta \times fc(t) = \tfrac{1}{2}(\cos 2\omega t \cdot \cos \theta + \cos \theta) \quad (2)$$

The result of addition by the adder 33 is a sum of equations (1) and (2), and accordingly shown by the following equation (3):

$$\tfrac{1}{2} \cdot \sin 2 \cdot t \cdot \sin \theta + \tfrac{1}{2}(\cos 2\omega t \cdot \cos \theta + \cos \theta) = \tfrac{1}{2}\{\cos (2\omega t + \theta) + \cos \theta\} \quad (3)$$

The result of addition by the adder 33 is delivered to a phase comparison section 34. The phase comparison section 34 is supplied with the frequency-doubled cosine wave signal ½·cos 2ωt from the frequency-doubled cosine wave generating section 27. The phase comparison section 34 compares the result of addition with the frequency-doubled cosine wave signal. The processing for the comparison will now be described in detail with reference to FIG. 3B. The phase comparison section 34 delivers a phase signal θ0 as the result of phase comparison. A subtractor 35 obtains the difference between the phase signal θ0 and a phase signal θ which is supplied thereto by an integrator (Σ) 37 as will be described later. An obtained differential signal Δθ is delivered to a proportional-integral (PI) control section 36, which control section 36 applies a proportional integration operation to the differential signal Δθ so that the differential signal Δθ is approximated to zero thereby to generate and deliver a phase signal θ. Furthermore, the PI control section 36 obtains a rotation angle speed signal ωM of the motor 1 during the aforementioned proportional integration operation.

FIG. 3B shows an arrangement of the phase comparison section 34. The phase comparison section 34 includes a high-pass filter 38, comparators 39 and 40 and a counter 41. The second term (direct current component) of equation (3) indicative of the result of addition by the adder 33 is passed through the high-pass filter 38, whereupon ½·cos (2ωt+θ) is supplied to the comparator 39. The comparator 39 compares the input data with threshold data indicative of a zero point of AC amplitude (zero cross comparison), thereby delivering data corresponding to a rectangular wave. On the other hand, the comparator 40 is supplied with a frequency-doubled cosine signal ½·cos 2ωt as input data and compares the frequency-doubled cosine signal with threshold data indicative of a zero point of AC amplitude. The comparator 40 delivers data corresponding to a rectangular wave.

Output signals of the comparators 39 and 40 are supplied to a counter 41. The counter 41 counts clock signals CLK thereby to count an interval between a rising edge of the output signal of the comparator 40, for example, and a rising edge of the output signal of the comparator 39, thereby delivering count data as the phase signal θ0. In this case, needless to say, the clock signal CLK has a frequency which is set to be higher than the frequency of the cosine wave signal ½·cos 2ωt.

Furthermore, the abnormal condition detecting section 23 monitors changes in the motor current supplied thereto via the A/D converter 21 and changes in the biphase signal delivered by the resolver 2. More specifically, the amplitude of the biphase signal delivered by the resolver 2 is not changed in an alternating-current manner but just indicates a constant excitation signal amplitude although the motor current changes in an alternating-current manner and the motor is in rotation. This indicates that the rotation position detection by the resolver 2 is not being carried out normally. Accordingly, in this case, an abnormal condition detection signal is delivered to the CPU 12 so that an abnormal condition coping process is carried out. The drive control of the motor 1 is interrupted and the resolver 2 and adjacent components are inspected and repaired.

The ΔΣ A/D converter 21 can execute a high accuracy A/D conversion without occurrence of missing code and has an arrangement simpler than a successive-approximation type. As a result, the ΔΣ A/D converter 21 is suitable for the mounting in the one-chip microcomputer 11.

According to the foregoing first embodiment, the RDC 16 is arranged so that the A/D converter 21 converts the biphase signal delivered by the resolver 2 and so that the signal processing to obtain the rotation position signal θ of the motor 1 is carried out by digital operation by the use of hardware. The RDC 16 thus arranged is mounted on the one-chip microcomputer 11. This eliminates a problem of time necessitated by the signal transfer between an external signal conversion IC and the microcomputer, a problem of exclusive use of a large number of terminals and the like can be overcome without sparing the processing capacity of the CPU 12 to signal conversion processing as in JP-A-2005-210839. Since the processing capacity of the CPU 12 is used for other controls, the control of the motor 1 can be rendered high accurate.

More specifically, the cosine wave signal fc(t) is supplied to the resolver 2 as the excitation signal. The first multiplier 31 multiplies the sine wave output fc(t)·sin θ from the resolver 2 by the sine wave signal fc(t), and the second multiplier 32 multiplies the cosine wave output fc(t)·cos θ by the cosine wave signal fc(t) which is the same as the excitation signal. The results of multiplications by the first and second multipliers 31 and 32 are added together by the adder 33. The result of addition is caused to pass through the high-pass filter 38. The phase comparison section 34 compares the phase of output signal of the high-pass filter 38 with the signal with the frequency twice as high as the excitation signal. The counter 41 counts the phase difference between both signals, thereby delivering the data of the phase difference as the position signal θ.

For example, in JP-A-H11-83544, the signal converter is intended to be configured by a monolithic semiconductor device. However, the circuit size is increased since a large part of the signal processing depends upon analog circuits. It is difficult to mount the signal converter on the one-chip microcomputer. On the other hand, the RDC 16 includes no parts depending upon the analog circuits and accordingly can reduce the circuit size. Consequently, the one-chip microcomputer 11 can easily be configured.

Furthermore, the RDC 16 is arranged so as to generate and deliver the excitation signal of the resolver 2 in synchronization with the signal with a frequency twice as high as the frequency of carrier wave which is used to PWM-control the motor 1. Consequently, the signal conversion processing can be carried out with the PWM carrier wave signal serving as a starting point of the control. Additionally, the abnormal condition detecting section 23 of the RDC 16 monitors the changes in the motor current and the biphase signal delivered by the resolver 2 to detect an abnormal condition of the resolver 2. Consequently, the fail safe of the motor control system can be improved by a simple arrangement.

Figure 4:
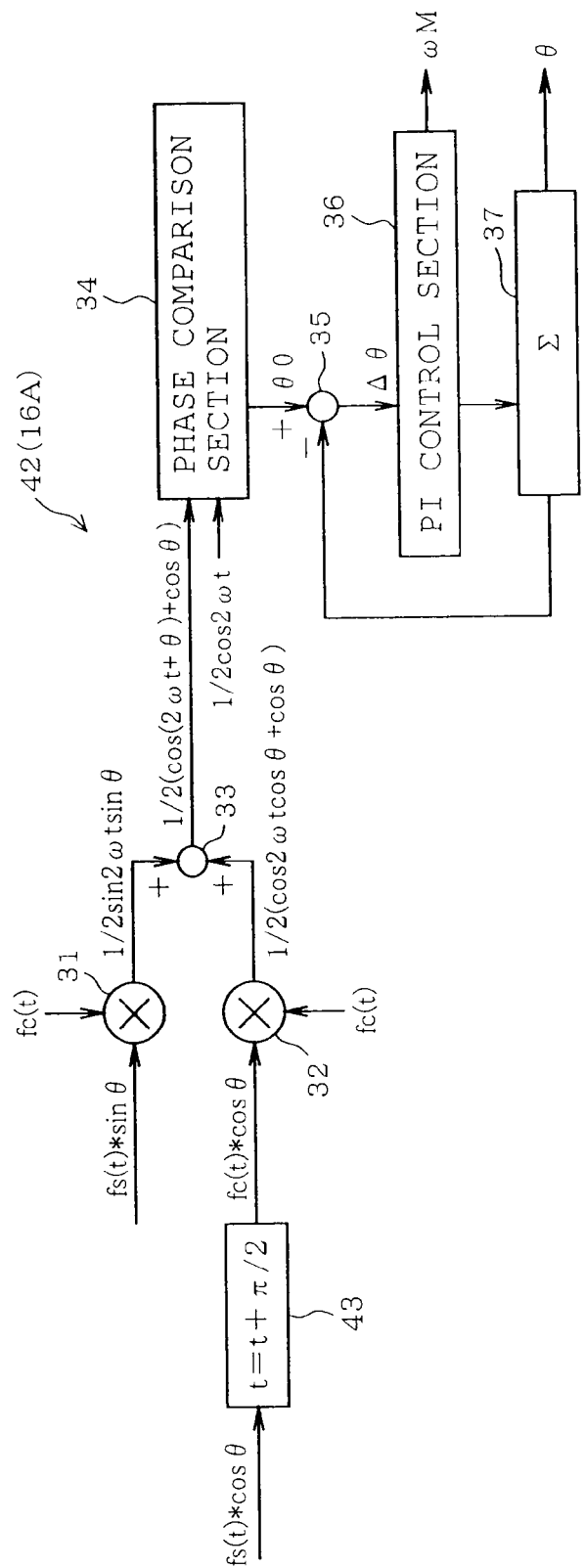
FIG. 4 is a view similar to FIG. 3A, showing a second embodiment.

FIG. 4 shows a second embodiment. Identical or similar parts in the second embodiment are labeled by the same reference symbols as those in the first embodiment, and the description of these parts is eliminated. Only the difference between the first and second embodiments will be described. FIG. 4 is a view similar to FIG. 3A in the first embodiment. Although the cosine wave signal fc (t) is supplied to the resolver 2 as the excitation signal in the first embodiment, a sine wave signal fs(t) is supplied to the resolver 2 as the excitation signal. FIG. 4 shows the arrangement of a signal processing section 42 of the RDC 16A in this case.

The signal processing section 42 is additionally provided with a ($\pi/2$) phase shifter 43 at the input side of the second multiplier 32 in the signal processing section 22 in the first embodiment. When the sine wave signal fs(t) is supplied to the resolver 2 as the excitation signal, the sine wave output fs (t)·sin $\theta$ is supplied to the first multiplier 31, and the cosine wave output fs(t)·cos $\theta$ is supplied via the phase shifter 43 to the second multiplier 32. Since the phase shifter 43 shifts the phase of the cosine wave output fs(t)·cos $\theta$ forward by $\pi/2$, the signal fc(t)·cos $\theta$ is supplied to the second multiplier 32.

In the above-described case, the first multiplier 31 multiplies the sine wave output fs(t)·sin $\theta$ by the cosine wave signal fc(t), and the second multiplier 32 multiplies the phase-shifted cosine wave output fc(t)·cos $\theta$ by the cosine wave signal fc(t). Consequently, the outputs of the first and second multipliers 31 and 32 are the same as those in the first embodiment. Subsequent signal processing is carried out in the same manner as in the first embodiment. Accordingly, the output signal fs (t) of the sine wave generating section 25 need not be supplied to the signal processing section 42.

According to the second embodiment, when the sine wave signal fs(t) is supplied to the resolver 2 as the excitation signal, both signals by which the first and second phase signals are multiplied are cosine wave signals fc(t) in the first and second multipliers 31 and 32 respectively. The phase of the second phase signal to be supplied to the second multiplier 32 is shifted forward by $\pi/2$ by the phase shifter 43. Consequently, the RDC 16A can be mounted on the one-chip microcomputer as in the first embodiment.

The foregoing embodiments described with reference to the accompanying drawings are not restrictive. The following modification or expansion may be possible. The cosine wave output may be the first phase signal, and the sine wave output may be the second phase signal.

The abnormal condition detecting section 23 may carry out the abnormal condition detection for the resolver in a different manner. For example, the CPU 12 may monitor on the control program. The abnormal condition detecting section 23 may be provided when needed.

The high-pass filter 38 may be set in such a range that a cut-off frequency blocks at least the second term of equation (3), cos $\theta$ indicative of a direct current component and allows the first term, cos ($2\omega t+\theta$) to pass therethrough.

The relationship among the PWM carrier wave frequency, the excitation signal frequency of the resolver and the signal processing frequency of the RDC may be set so as to be three times higher or at the same frequency. Furthermore, the excitation signal frequency of the resolver may differ from the signal processing frequency of the RDC. Furthermore, the PWM carrier wave signal should not be limited to 15 kHz and may be changed suitably.

The PI control section 36 and the integrator 37 may be provided if the occasion arises. The output of the phase comparison section 34 may be delivered as the phase signal G. The PWM signal output section 15 may be configured by an external circuit. The A/D converter should not be limited to the AS and may be of a sequential comparison type. Additionally, the part of each signal to be converted by the A/D converter should not be limited to an initial input in the RDC but may be changed according to individual designing.

The foregoing description and drawings are merely illustrative of the principles and are not to be construed in a limiting sense. Various changes and modifications will become apparent to those of ordinary skill in the art. All such changes and modifications are seen to fall within the scope as defined by the appended claims.

What is claimed is:

1. A microcomputer which obtains a rotor position signal from a biphase signal delivered by a resolver mounted on an electric motor according to a rotation phase of a rotor relative to a stator, thereby controlling the motor based on the rotor position signal, the microcomputer comprising a digital signal converter which is configured by hardware and converts the biphase signal delivered from the resolver into a digital data position signal, the digital signal converter being mounted on a single chip, wherein the digital signal converter includes:

a first multiplier which multiplies a first phase signal delivered from the resolver by a signal shifted in phase by $\pi/2$ relative to an excitation signal by which the first phase signal is multiplied;

a second multiplier which multiplies a second phase signal delivered from the resolver by a signal in phase with an excitation signal by which the second phase signal is multiplied;

an adder which adds results of calculation by the first and second multipliers;

a high-pass filter which passes predetermined higher frequencies as a result of addition by the adder, thereby delivering an output signal; and a phase comparison section which compares a phase of the output signal of the high-pass filter with a phase of signal having a frequency twice as high as the excitation signal thereby to obtain data further obtained by counting a phase difference between the compared signals by the counter, thereby delivering the obtained data as a position signal.

2. The microcomputer according to claim 1, wherein the signal by which the first multiplier multiplies the first phase signal is a sine-wave signal, and the signal by which the second multiplier multiplies the second phase signal is a cosine-wave signal same as the excitation signal supplied to the resolver.

3. The microcomputer according to claim 1, wherein the excitation signal supplied to the resolver is a sine-wave signal, the signals by which the first and second multipliers multiply the first and second phase signals are cosine-wave signals, and the digital signal converter includes a phase shifter which shifts forward in phase by $\pi/2$ the second phase signal supplied to the second multiplier.

4. The microcomputer according to claim 1, wherein the motor is PWM-controlled with use of a carrier-wave signal, the excitation signal applied to the resolver has a period which is set so as to be same as the carrier wave signal used in the PWM control or which is obtained by equally dividing the carrier-wave period.

5. The microcomputer according to claim 1, wherein the motor is PWM-controlled with use of a carrier-wave signal, and the digital signal converter sets a conversion processing period of the position signal which is obtained by equally dividing a period of the carrier-wave signal.

6. The microcomputer according to claim 1, wherein the digital signal converter includes a motor current detector to which a signal indicative of current flowing into the motor is supplied, and a resolver abnormal condition detector which detects an abnormal condition of the resolver when the biphase signal supplied by the resolver remains unchanged, thereby delivering an abnormal condition signal.

7. A motor control system comprising:
a motor control circuit including a microcomputer which obtains a rotor position signal from a biphase signal delivered by a resolver mounted on an electric motor according to a rotation phase of a rotor relative to a stator, thereby controlling the motor based on the rotor position signal, the microcomputer comprising a digital signal converter which is configured by hardware and converts the biphase signal delivered from the resolver into a digital data position signal, the digital signal converter being mounted on a single chip; and
a drive circuit controlled by the motor control circuit to drive the motor, wherein the digital signal converter includes:
a first multiplier which multiplies a first phase signal delivered from the resolver by a signal shifted in phase by $\pi/2$ relative to an excitation signal by which the first phase signal is multiplied;
a second multiplier which multiplies a second phase signal delivered from the resolver by a signal in phase with an excitation signal by which the second phase signal is multiplied;
an adder which adds results of calculation by the first and second multipliers;
a high-pass filter which passes predetermined higher frequencies as a result of addition by the adder, thereby delivering an output signal; and
a phase comparison section which compares a phase of the output signal of the high-pass filter with a phase of signal having a frequency twice as high as the excitation signal thereby to obtain data further obtained by counting a phase difference between the compared signals by a counter, thereby delivering the obtained data as a position signal.

* * * * *